(12) United States Patent
Siris

(10) Patent No.: US 9,494,690 B2
(45) Date of Patent: *Nov. 15, 2016

(54) SYSTEMS AND METHODS FOR IDENTIFYING ATTRIBUTES LOCATED ALONG SEGMENTS OF A DRIVING ROUTE

(71) Applicant: United Parcel Service of America, Inc., Atlanta, GA (US)

(72) Inventor: Marc David Siris, Sandy Springs, GA (US)

(73) Assignee: UNITED PARCEL SERVICE OF AMERICA, INC., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/815,461

(22) Filed: Jul. 31, 2015

(65) Prior Publication Data

US 2015/0338221 A1 Nov. 26, 2015
US 2016/0265921 A2 Sep. 15, 2016

Related U.S. Application Data

(63) Continuation of application No. 13/039,991, filed on Mar. 3, 2011, now Pat. No. 9,134,426, which is a continuation-in-part of application No. 12/883,946, filed on Sep. 16, 2010, now Pat. No. 8,378,854.

(51) Int. Cl.
  G08B 21/00 (2006.01)
  G01S 19/07 (2010.01)
  G01C 21/32 (2006.01)

(52) U.S. Cl.
  CPC .............. *G01S 19/07* (2013.01); *G01C 21/32* (2013.01)

(58) Field of Classification Search
  CPC .............. B60W 2550/402; G01C 21/00; G01S 19/07; G01S 19/14
  See application file for complete search history.

(56) References Cited

U.S. PATENT DOCUMENTS

| | | |
|---|---|---|
| 5,374,933 A | 12/1994 | Kao |
| 5,682,139 A | 10/1997 | Pradeep et al. |
| 5,751,244 A | 5/1998 | Huston et al. |
| 5,856,802 A | 1/1999 | Ura et al. |
| 5,862,511 A | 1/1999 | Croyle et al. |
| 6,405,125 B1 | 6/2002 | Ayed |
| 6,581,005 B2 | 6/2003 | Watanabe et al. |

(Continued)

OTHER PUBLICATIONS

Smith, L.A., et al., "GPS Position Latency Determination and Ground Speed for Calibration for the SATLOC AirStar M3," *Applied Engineering in Agriculture*, Apr. 2005, pp. 769-776, vol. 21, Issue 5, American Society of Agricultural Engineers, U.S.A.

(Continued)

*Primary Examiner* — Mark Rushing
(74) *Attorney, Agent, or Firm* — Alston & Bird LLP

(57) ABSTRACT

Various embodiments of the present invention provide systems, methods, and computer program products for identify the probability of a particular attribute being located along a segment of interest for a driving route. In general, various embodiments of the invention involve representing the segment of the driving route by patterns of speed variations obtained from GPS elements along the segment of the driving route and using the representation as input for functions representing various types of attributes to determine the probability of a particular type of attribute existing along the segment of the driving route.

18 Claims, 6 Drawing Sheets

(56) References Cited

U.S. PATENT DOCUMENTS

| | | |
|---|---|---|
| 6,657,584 B2 | 12/2003 | Cavallaro et al. |
| 6,861,980 B1 | 3/2005 | Rowitch et al. |
| 7,463,974 B2 | 12/2008 | Morita et al. |
| 7,626,544 B2 | 12/2009 | Smith et al. |
| 7,840,220 B1 | 11/2010 | Mitchell |
| 8,378,854 B1 | 2/2013 | Siris |
| 8,766,822 B2 | 7/2014 | Siris |
| 8,791,841 B2 | 7/2014 | Siris |
| 2002/0164998 A1 | 11/2002 | Younis |
| 2002/0173881 A1 | 11/2002 | Lash et al. |
| 2003/0025597 A1 | 2/2003 | Schofield |
| 2003/0098802 A1 | 5/2003 | Jones |
| 2003/0151501 A1 | 8/2003 | Teckchandani et al. |
| 2004/0249566 A1 | 12/2004 | Jeon |
| 2005/0027442 A1 | 2/2005 | Kelley et al. |
| 2005/0251330 A1 | 11/2005 | Waterhouse et al. |
| 2006/0071849 A1 | 4/2006 | Howle et al. |
| 2006/0212195 A1 | 9/2006 | Veith et al. |
| 2006/0214844 A1 | 9/2006 | Fagan et al. |
| 2008/0027645 A1 | 1/2008 | Okada et al. |
| 2009/0254266 A1 | 10/2009 | Altrichter et al. |
| 2009/0265072 A1 | 10/2009 | Kondou et al. |
| 2010/0039314 A1 | 2/2010 | Gupta |
| 2010/0211247 A1 | 8/2010 | Sherony |
| 2010/0295726 A1 | 11/2010 | Tann |
| 2010/0305850 A1 | 12/2010 | Krumm et al. |
| 2014/0257690 A1 | 9/2014 | Siris |
| 2014/0257691 A1 | 9/2014 | Siris |

OTHER PUBLICATIONS

United States Patent and Trademark Office, Notice of Allowance and Fee(s) Due for U.S. Appl. No. 12/883,946, dated Nov. 14, 2012, 15 pages, U.S.A.

United States Patent and Trademark Office, Notice of Allowance and Fee(s) Due for U.S. Appl. No. 13/673,329, dated Apr. 7, 2014, 7 pages, U.S.A.

United States Patent and Trademark Office, Notice of Allowance and Fee(s) Due for U.S. Appl. No. 13/741,805, dated Apr. 2, 2014, 7 pages, U.S.A.

United States Patent and Trademark Office, Office Action for U.S. Appl. No. 13/039,991, Sep. 11, 2014, 18 pages, U.S.A.

United States Patent and Trademark Office, Office Action for U.S. Appl. No. 13/039,991, Dec. 18, 2013, 13 pages, U.S.A.

United States Patent and Trademark Office, Office Action for U.S. Appl. No. 13/039,991, Jul. 18, 2013, 13 pages, U.S.A.

United States Patent and Trademark Office, Office Action for U.S. Appl. No. 13/741,805, Aug. 28, 2013, 8 pages, U.S.A.

United States Patent and Trademark Office, Office Action for U.S. Appl. No. 12/883,946, dated Oct. 15, 2012, 11 pages, U.S.A.

United States Patent and Trademark Office, Office Action for U.S. Appl. No. 13/673,329, Sep. 25, 2013, 11 pages, U.S.A.

United States Patent and Trademark Office, Office Action for U.S. Appl. No. 13/039,991, Apr. 9, 2014, 17 pages, U.S.A.

United States Patent and Trademark Office, Notice of Allowance for U.S. Appl. No. 13/039,991, May 27, 2015, 9 pages, U.S.A.

United States Patent and Trademark Office, Office Action for U.S. Appl. No. 14/282,489, Apr. 14, 2016, 14 pages, U.S.A.

United States Patent and Trademark Office, Office Action for U.S. Appl. No. 14/281,942 Apr. 14, 2016, 15 pages, U.S.A.

VEHICLE DEVICE

Error Correction Module 400

Data Collection Module 500

Point-of-Interest Module 700

SYSTEMS AND METHODS FOR IDENTIFYING ATTRIBUTES LOCATED ALONG SEGMENTS OF A DRIVING ROUTE

CROSS-REFERENCE TO RELATED APPLICATIONS

This application is a continuation of, and claims the benefit of, U.S. Nonprovisional application Ser. No. 13/039,991, filed Mar. 3, 2011, which is a continuation-in-part of U.S. Nonprovisional application Ser. No. 12/883,946 entitled "Systems and Methods for Improved Augmentation for GPS Calculations", filed Sep. 16, 2010, the contents of both of which are incorporated herein by reference in their entirety.

BACKGROUND

In general, a global positioning system (GPS) is a space-based global navigation satellite system that provides location and time information at practically all times and for practically anywhere on the Earth when and where there is an unobstructed line of sight to four or more GPS satellites. Generally, a GPS receiver calculates a position of the receiver by precisely timing the signals sent by the GPS satellites. Each satellite continually transmits messages that include such information as the time the message was transmitted, the precise orbital information for the satellite, and the general system health and rough orbits of all GPS satellites. The GPS receiver utilizes the messages it receives to determine a transit time of each message and computes the distance to each satellite. These distances along with the satellites' locations are used to compute the position of the receiver.

In many instances, services providing navigational assistance rely on a well-defined and up-to-date cartographic database. Such a database may contain information about the topology of a road network as well as other relevant attributes, such as number of road lanes, types of pavement, and types of traffic-controls. Typically, manual processing is used to create and maintain such databases. For instance, an individual may drive through a region of interest to identify changes of roads and modify/update the database accordingly. Further, an individual may extract information about roads from cartographic resources such as overhead imagery or locational signals.

In contrast, GPS signals are typically easier to collect and may be analyzed to detect the locations of various attributes along points of interest and to refine/extract the topological structure of a road network. Thus, a need exists to further utilize GPS signals for identifying relevant attributes of road networks and points of interest along various segments of a driving route.

BRIEF SUMMARY OF VARIOUS EMBODIMENTS OF THE INVENTION

Various embodiments of the invention include systems and methods for providing a prediction of a type of attribute located along a segment of a driving route based on speed variation obtained from GPS elements. In these particular embodiments, the prediction provides an indication of whether the type of attribute is present along the segment of the driving route. For instance, the attribute may be at least one of a traffic light, a stop sign, a yield sign, a speed bump, a reduced speed zone, or mixed traffic signals.

In particular embodiments, the systems and methods retrieve a plurality of GPS elements, each GPS element including a sequence of GPS element points. Further, in particular embodiments, the systems and methods identify, for each GPS element, whether the GPS element passes along the segment of the driving route and, for each GPS element that passes along the segment, identify a portion of the GPS element (comprising one or more GPS element points) recorded along the segment of the driving route to include in an input GPS set. In particular embodiments, the steps for defining the input GPS set may further include producing a topology from the GPS elements that pass along the segment of the driving route, drawing a rectangle to encompass at least a portion of the segment of the driving route in order to define a boundary, and including in the input GPS set the GPS element points located inside the boundary from the portions of the GPS elements that pass along the segment of the driving route.

Further, in various embodiments, the systems and methods represent the segment of the driving route by a feature vector capturing the speed variation, the feature vector being configured based on one or more points of the input GPS set. The systems and methods input the feature vector into a function for the type of attribute to obtain the prediction indicating whether the type of attribute is located along the segment of the driving route. In particular embodiments, the feature vector includes the average value of M number of speed values sampled from each of the GPS elements associated with the segment of the driving route.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF VARIOUS EMBODIMENTS OF THE INVENTION

Figure 1:
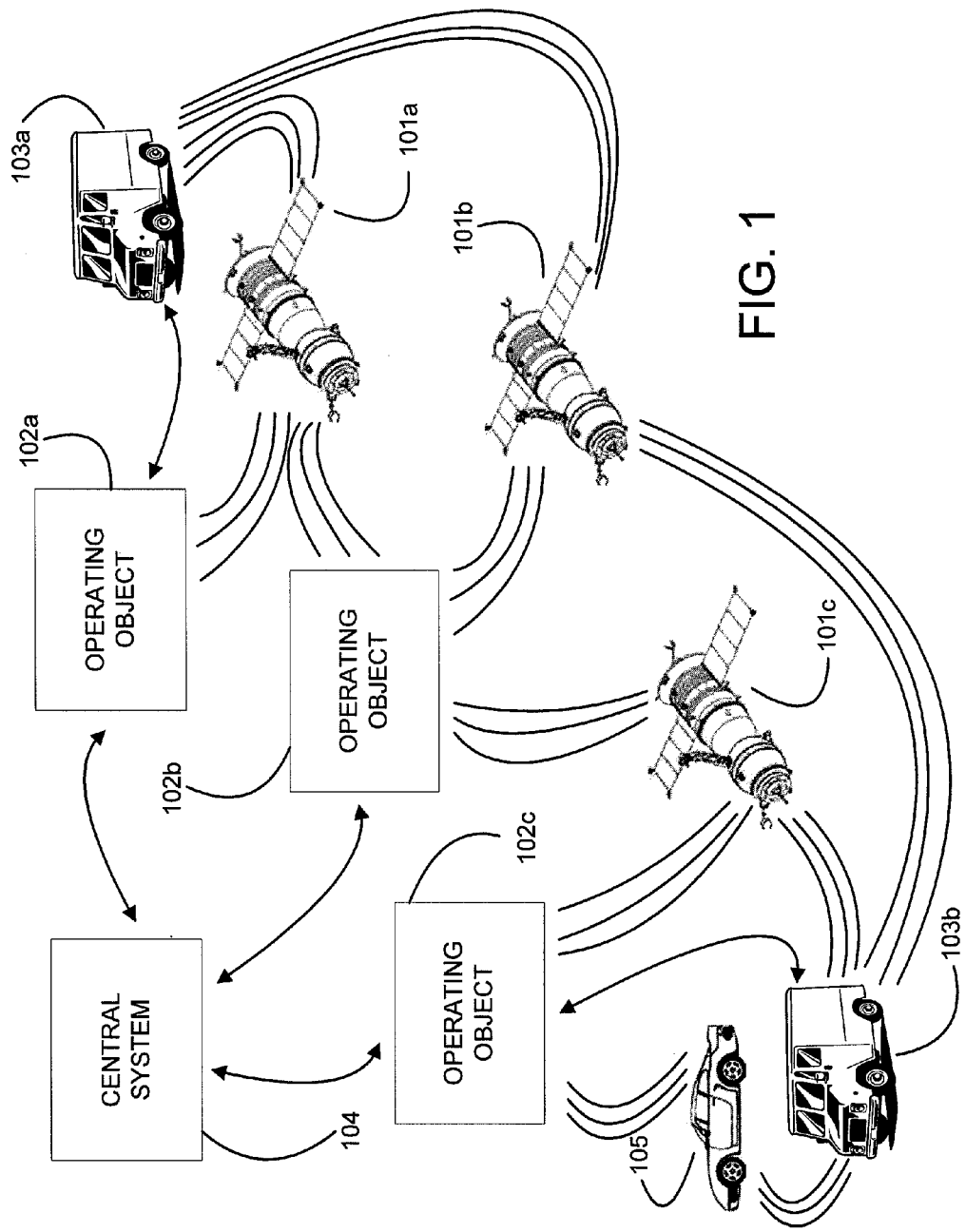
FIG. 1 shows an overview of one embodiment of an architecture that can be used to practice various aspects of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

I. METHODS, APPARATUS, SYSTEMS, AND COMPUTER PROGRAM PRODUCTS

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Particular embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. EXEMPLARY SYSTEM ARCHITECTURE

FIG. 1 provides an illustration of an architecture that can be used in conjunction with various embodiments of the present invention. As shown in FIG. 1, the architecture includes multiple satellites 101a, 101b, 101c. In this particular instance, these satellites 101a, 101b, 101c make up part of a Global Positioning System, and in particular the space segment of a Global Positioning System (GPS).

In general, the space segment of a typical GPS includes multiple orbiting satellites arranged into a set of planes. For instance, in a particular GPS, the space segment may be made up of twenty-four (24) orbiting satellites that form six planes with four satellites in each plane. In addition, the orbits of the satellites may be arranged so that a minimum number of satellites (e.g., at least six satellites) are always within line of sight from almost everywhere on the Earth's surface. For illustration purposes, FIG. 1 shows three satellites 101a, 101b, 101c in the GPS; however, it should be understood that other embodiments may include more satellites.

In general, the satellites 101a, 101b, 101c send out signals (e.g., messages) that are received by a GPS receiver. In turn, the GPS receiver determines from the messages the time the signals were sent from and the satellites' 101a, 101b, 101c positions corresponding to the times the signals were sent. Knowing the time the signals were received, the GPS receiver can compute the transit time of the message, and assuming the message traveled at the speed of light, the distance the signals traveled. A satellite's position and distance traveled define a sphere, centered on the respective satellite with a radius equal to the distance traveled. The position of the receiver is positioned somewhere on the surface of this sphere. Thus, the indicated position of the GPS receiver is at the intersection of the surfaces of the spheres.

Returning to FIG. 1, the architecture also includes operating objects 102a, 102b, 102c. In this particular embodiment, the operating objects 102a, 102b, 102c are stationary "objects" within a common carrier's delivery network. For example, the common carrier may be a carrier such as United Parcel Service (UPS®). UPS® delivers approximately 15.1 million packages and documents daily in more than 200 countries and territories. UPS® includes a number of retail locations such as approximately 4,600 UPS Stores®, 75 Mail Boxes Etc.®, 1,000 UPS® customer centers, 16,000 authorized outlets, and 40,000 UPS® drop boxes. In addition, UPS® includes approximately 1,800 operating facilities operating in more than 120 countries. These operating facilities include air hubs in the United States, Europe, and Asia and approximately 215 service centers. Thus, in the case of UPS®, the operating objects 102a, 102b, 102c depicted in FIG. 1 may include any number of these retail locations and/or operating facilities.

Further, in this particular architecture, each operating object 102a, 102b, 102c includes a GPS device (not shown) that may serve as a receiver and/or transceiver and is associated with the operating object 102a, 102b, 102c and is configured to receive signals from one or more of the GPS satellites 101a, 101b, 101c. As explained in further detail below, the signals are used to calculate a location of the GPS device on the particular operating object 102a, 102b, 102c and an error correction is determined from the calculated location. The error correction is the difference between the calculated position that is determined based on the received signals from the GPS satellites 101a, 101b, 101c and a predetermined location of the GPS device on the operating object 102a, 102b, 102c.

In particular embodiments, the error correction may be transmitted from the operating object to one or more delivery vehicles 103a, 103b, 103c of the common carrier. For instance, in various embodiments, each operating object 102a, 102b, 102c is equipped with a communication device (e.g., transmitter or transceiver) that communicates (e.g., transmits) the correction error to devices residing on various delivery vehicles 103a, 103b, 103c as they pass within a predetermined distance of the operating object 102a, 102b, 102c. In particular embodiments, the communication device may be a component of the GPS device associated with the operating object 102a, 102b, 102c. In one embodiment, the communication device may transmit the error correction over a closed wireless communication channel that is only accessible by the delivery vehicles 103a, 103b, 103c. In another embodiment, the communication device may transmit the error correction over an open wireless communication channel (e.g., the communication device may broadcast the error correction over open airwaves) so that other vehicles 105 in addition to the delivery vehicles 103a, 103b, 103c may have access to (and receive) the error correction. Yet, in another embodiment, the operating object 102a, 102b, 102c may provide the error correction to one or more entities outside the common carrier. For example, the operating object 102a, 102b, 102c may communicate the error correction to facilities associated with GPS service providers such as Garmin®, Tom-Tom®, Microsoft®, Google®, RIM®, and Apple®.

As is discussed in greater detail below, in various embodiments, the delivery vehicles 103a, 103b, 103c receive the error correction and use the error correction for their own GPS navigation systems and/or communicate (e.g., transmit) the error correction as they travel along their delivery routes. For instance, in particular embodiments, the drivers of the delivery vehicles 103a, 103b, 103c may carry a portable data acquisition device (DIAD) that includes GPS capabilities. Therefore, in these particular embodiments, the error correction is transmitted to the driver's DIAD so that the error correction may be used in conjunction with the GPS capabilities on the device. In other embodiments, the delivery vehicles 103a, 103b, 103c may have built-in GPS navigation systems that may use the error correction.

In addition, in various embodiments, the delivery vehicles 103a, 103b, 103c may also communicate GPS data back to the operating objects 102a, 102b, 102c. As discussed in greater detail below, the delivery vehicles 103a, 103b, 103c may collect GPS data as the vehicles 103a, 103b, 103c travel along their delivery routes. For instance, a driver's DIAD may record GPS data as the driver travels his route making his deliveries. This GPS data may include location data determined at predetermined time intervals. For example, the driver's DIAD may be configured to determine the driver's location for every second as the driver travels on his route. In addition, the DIAD may record additional information along with the GPS specific data such as information that may relate to a delivery the driver is making at the time the location data is measured. For example, the additional information may indicate that the driver was out of the vehicle 103a, 103b, 103c and at the door of a delivery location. As explained below, such additional information may help to fine tune the collected GPS data.

Further, in various embodiments, the operating objects 102a, 102b, 102c may send the collected GPS data from the various delivery vehicles 103a, 103b, 103c to a central system 104. In particular embodiments, the central system 104 includes one or more types of storage media for storing the GPS data received from the various operating objects 102a, 102b, 102c. In addition, the central system 104 may include a database management system and the storage media may include one or more databases and one or more database instances. In various embodiments, the storage media may be one or more types of medium such as hard disks, magnetic tapes, or flash memory. The term "database" refers to a structured collection of records or data that is stored in a computer system, such as via a relational database, hierarchical database, or network database. In addition, the operating objects 102a, 102b, 102c and the central system 104 may be in electronic communication with one another over the same or different wireless or wired networks including a wired or wireless Personal Area Network ("PAN"), Local Area Network ("LAN"), Metropolitan Area Network ("MAN"), Wide Area Network ("WAN"), the Internet, or the like.

Finally, while FIG. 1 illustrates the architecture according to one embodiment of the invention, it should be understood that the various components of the architecture, as described above, may be configured differently in other embodiments. Therefore, the various aspects of the claimed invention are not limited to this particular architecture.

a. Operating Object Server

Figure 2:
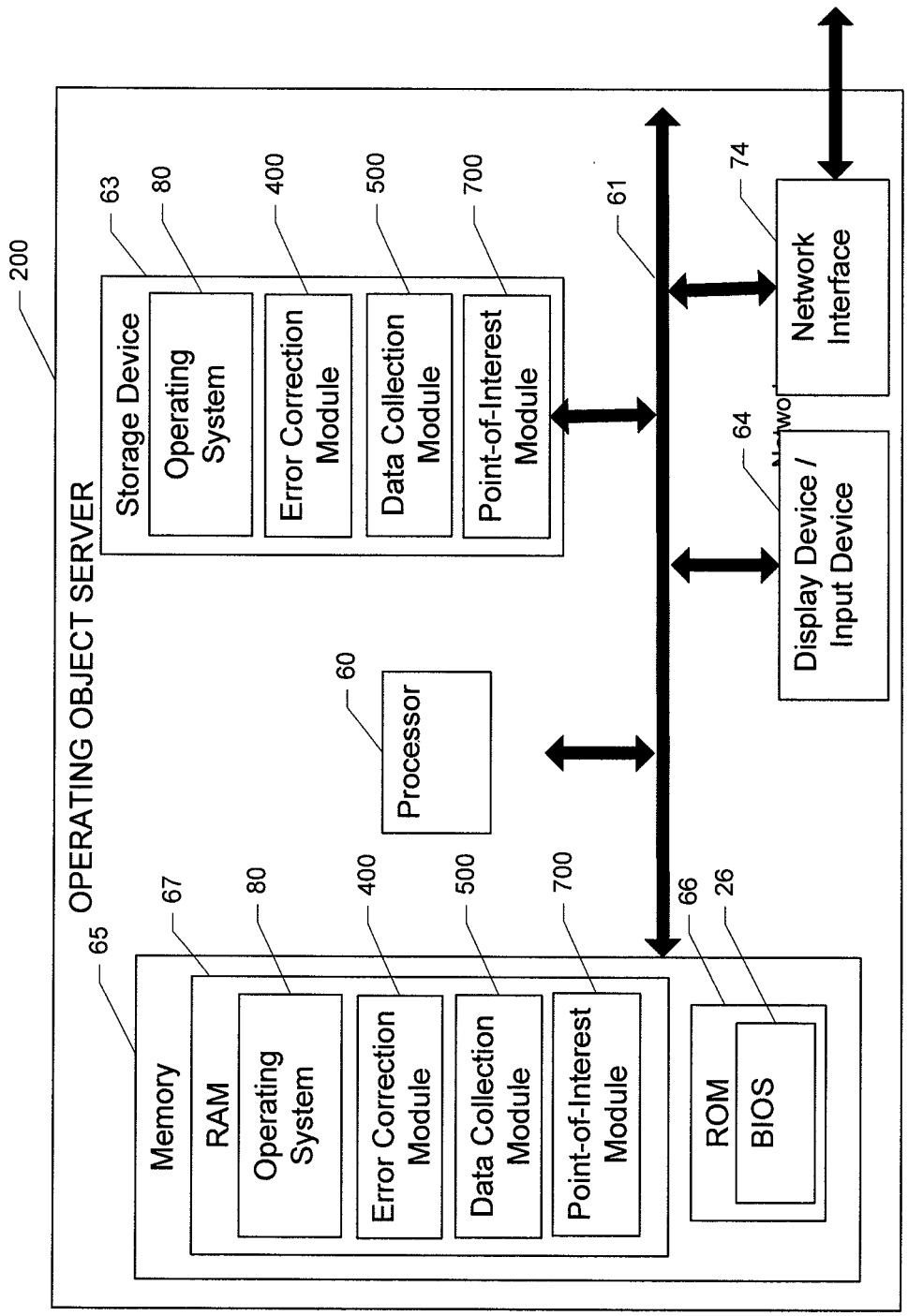
FIG. 2 shows an exemplary schematic diagram of an operating object server according to one embodiment of the present invention.

In various embodiments, the operating objects 102a, 102b, 102c may include one or more computing devices (such as one or more servers) that assist in providing functionality for one or more aspects of the invention. FIG. 2 provides a schematic of an operating object server 200 according to one embodiment of the present invention. The term "server" is used generically to refer to any computer, computing device, desktop, notebook or laptop, distributed system, server, gateway, switch, or other processing device adapted to perform the functions described herein. As will be understood from this figure, in this embodiment, the operating object server 200 includes a processor 60 that communicates with other elements within the operating object server 200 via a system interface or bus 61. The processor 60 may be embodied in a number of different ways. For example, the processor 60 may be embodied as various processing means such as a processing element, a microprocessor, a coprocessor, a controller or various other processing devices including integrated circuits such as, for example, an application specific integrated circuit ("ASIC"), a field programmable gate array ("FPGA"), a hardware accelerator, or the like. In an exemplary embodiment, the processor 60 may be configured to execute instructions stored in the device memory or otherwise accessible to the processor 60. As such, whether configured by hardware or software methods, or by a combination thereof, the processor 60 may represent an entity capable of performing operations according to embodiments of the present invention while configured accordingly. A display device/input device 64 for receiving and displaying data is also included in the operating object server 200. This display device/input device 64 may be, for example, a keyboard or pointing device that is used in combination with a monitor. The operating object server 200 further includes memory 65, which may include both read only memory ("ROM") 66 and random access memory ("RAM") 67. The application server's ROM 66 may be used to store a basic input/output system ("BIOS") 26 containing the basic routines that help to transfer information to the different elements within the operating object server 200.

In addition, in one embodiment, the operating object server 200 includes at least one storage device 63, such as a hard disk drive, a CD drive, and/or an optical disk drive for storing information on various computer-readable media. The storage device(s) 63 and its associated computer-readable media may provide nonvolatile storage. The computer-readable media described above could be replaced by any other type of computer-readable media, such as embedded or removable multimedia memory cards ("MMCs"), secure digital ("SD") memory cards, Memory Sticks, electrically erasable programmable read-only memory ("EEPROM"), flash memory, hard disk, or the like. Additionally, each of these storage devices 63 may be connected to the system bus 61 by an appropriate interface.

Furthermore, a number of program modules (e.g., set of computer program instructions) may be stored by the various storage devices 63 and/or within RAM 67. Such program modules may include an operating system 80, an error correction module 400, a data collection module 500, and a point-of-interest module 700. These modules 400, 500, 700 may control certain aspects of the operation of the operating object server 200 with the assistance of the processor 60 and operating system 80, although their functionality need not be modularized.

Also located within the operating object server 200, in one embodiment, is a network interface 74 for interfacing with various computing entities. This communication may be via the same or different wired or wireless networks (or a combination of wired and wireless networks), as discussed above. For instance, the communication may be executed using a wired data transmission protocol, such as fiber distributed data interface ("FDDI"), digital subscriber line ("DSL"), Ethernet, asynchronous transfer mode ("ATM"), frame relay, data over cable service interface specification ("DOCSIS"), or any other wired transmission protocol. Similarly, the operating object server 200 may be configured to communicate via wireless external communication networks using any of a variety of protocols, such as 802.11, general packet radio service ("GPRS"), wideband code division multiple access ("W-CDMA"), or any other wireless protocol.

It will be appreciated that one or more of the operating object server's 200 components may be located remotely from other operating object server 200 components, such as multiple operating object servers 200. Furthermore, one or more of the components may be combined and additional components performing functions described herein may be included in the operating object server 200.

b. Vehicle Device

As previously described, in various embodiments, the delivery vehicles 103a, 103b, 103c include one or more vehicle devices that assist with different aspects of the invention. For instance, in one embodiment, delivery vehicles 103a, 103b, 103c include a GPS enabled device and a separate communication device. In this particular embodiment, the GPS enabled device is configured to perform GPS functionality and the communication device is configured to perform communication functionality for the vehicle 103a, 103b, 103c and/or the driver. However, in other embodiments, the functionality of the GPS enable device and communication device may be combined into one device on the vehicle 103a, 103b, 103c.

Figure 3:
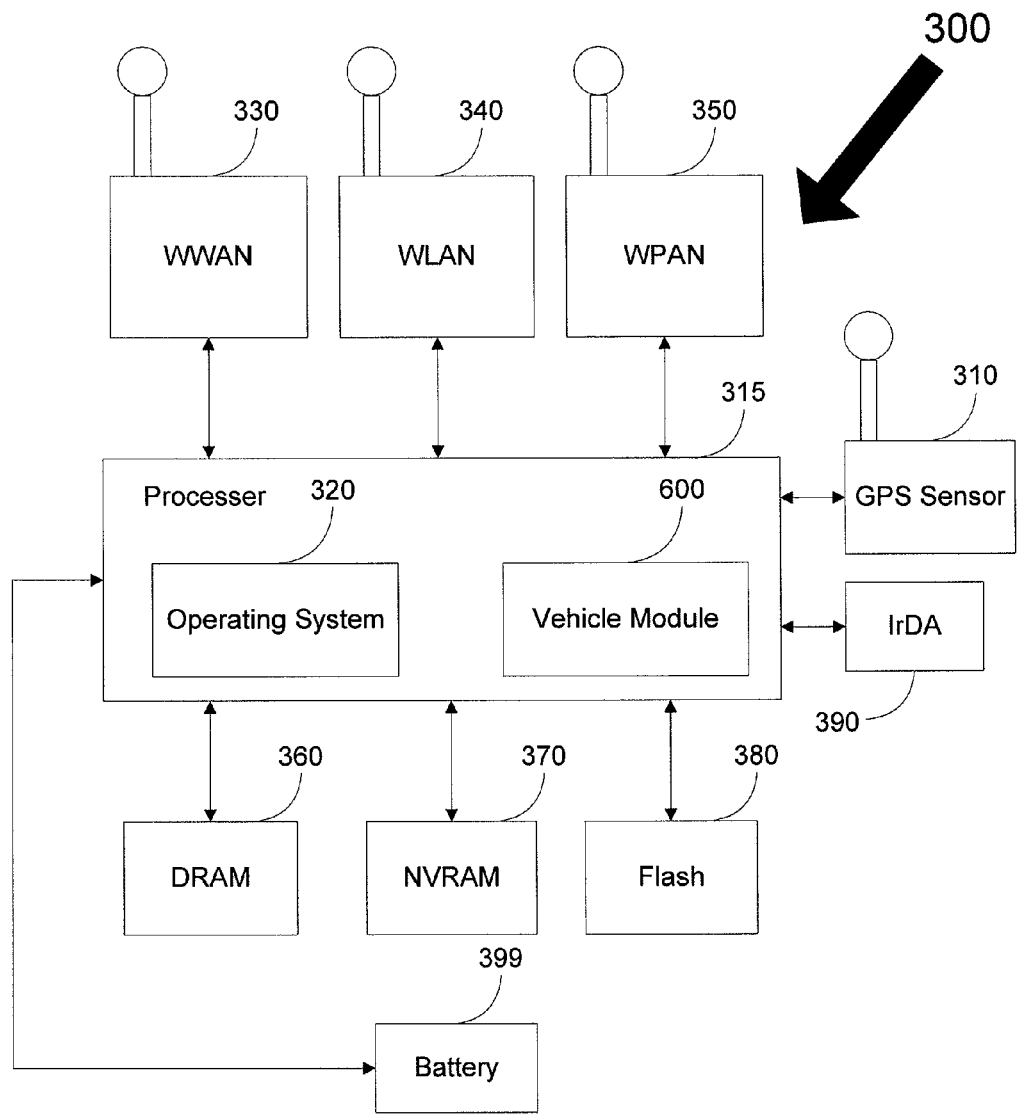
FIG. 3 shows an exemplary schematic diagram of a vehicle device according to one embodiment of the present invention.

In addition, in particular embodiments, the vehicle device may be affixed to the vehicle 103a, 103b, 103c and thus may be considered a component of the vehicle 103a, 103b, 103c. However, in other embodiments, the vehicle devices may not be affixed to the vehicles. For instance, in various embodiments, the vehicle devices are portable data acquisition devices (DIAD) that are carried by the drivers of the delivery vehicles. In these particular embodiments, the driver may use the portable DIAD to record and monitor various aspects of the driver's daily delivery tasks. For example, the driver may have a delivery recipient electronically sign the DIAD upon receiving a package from the driver. FIG. 3 provides a schematic of a vehicle device 300 that is a DIAD according to one embodiment of the present invention. The term "vehicle devices," as used herein, should be interpreted broadly as including GPS enabled devices that may be attached and not attached to vehicles, unless specified otherwise. Moreover, the vehicle devices 300 may include GPS enabled devices with integrated communication devices or separate communication devices.

In particular embodiments, the vehicle device 300 may include a GPS sensor 310 that is configured to acquire, for example, a latitude, longitude, altitude, course, speed, universal time (UTC), and date. In various embodiments, this data may be acquired in National Electrical Manufacturers Association (NEMA) data format or other appropriate data format. As will be appreciated by one skilled in the art, the GPS sensor 310 acquires data, sometimes known as ephemeris data, identifying the number of GPS satellites in view and the relative positions of those satellites. In addition, data regarding, for example, heading and ETA of the device 300 can also be captured, which enhances the determination of the position of the GPS sensor 310 and allows an area to be profiled or segmented based on the common characteristics of the data.

Further, in particular embodiments, the vehicle device 300 may be configured to receive an error correction from an operating object 102a, 102b, 102c as described with reference to FIG. 2. In many instances, a satellite's positioning accuracy is impeded by errors in its clock and signal delays caused by atmospheric conditions. For example, atmospheric inconsistencies affect the speed of the GPS signals as they pass through the Earth's atmosphere, especially the ionosphere. Thus, correcting these errors is a significant challenge to improving position accuracy.

In many instances, an augmentation system is used to compensate for these discrepancies by transmitting error corrections that are determined based on known locations. For example, many augmentation systems use earth stations (e.g., stationary objects) that have exact known locations. These stations are configured to receive GPS signals and the stations then compare the location determined from the signals with values associated with the known locations for the stations. The differences between the locations determined from the signals and the known locations are used to calculate error corrections. These error corrections may then be used by various GPS devices to correction GPS readings for the devices.

In various embodiments, the carrier may install GPS devices on various operating objects 102a, 102b, 102c located throughout the carrier's delivery network. As previously described, in various embodiments, the GPS devices are configured to receive signals from one or more of the satellites 101a, 101b, 101c and to communicate (e.g., transmit) an error correction determined from the calculated location of a device on a respective operating object 102a, 102b, 102c to one or more vehicle devices 300 that pass within a predetermined distance. For instance, in one particular embodiment, the GPS device transmits an error correction over open airwaves and a DIAD carried by a delivery vehicle 103a, 103b, 103c receives the transmitted error correction when it is within a predetermined distance from the operating object 102a, 102b, 102c. In addition, other mobile GPS enabled devices (such as a passenger's car's GPS navigation system, a pedestrian's cellular telephone, or personal GPS navigation device) may receive the error correction when the devices are within a predetermined distance from the operating object 102a, 102b, 102c.

For example, the carrier may install stationary GPS devices on a number of the carrier's operating centers throughout the United States. The devices receive GPS signals and calculate a location for the device on the particular operating center associated with the device using the signals. In addition, an error correction is determined based on the calculated location from the GPS signals and the known location for the device on the operating center. The error correction may then be transmitted by the GPS device (e.g., a transmitter component on the GPS device) to a vehicle device 300. For instance, as delivery vehicles 103a, 103b, 103c arrive and depart the operating center, the DIADs associated with the vehicles 103a, 103b, 103c receive the error correction. Therefore, as the delivery vehicles 103a, 103b, 103c travel their delivery routes and the DIADs calculate various locations along the routes using signals received by their GPS sensor, the DIADs on the vehicles 103a, 103b, 103c can use the error correction during the location calculation to improve the accuracy of the location calculation. Further, other types of vehicles 105 (or pedestrians), such as passenger cars, that pass within the predetermined distance from the operating center may have GPS navigation systems or other GPS enabled devices that can also receive the error correction to use in GPS calculations.

Thus, returning to FIG. 3, many uses for a GPS sensor 310 in combination with the vehicle device 300 will be readily appreciated by one of ordinary skill in the art. For instance, the GPS sensor 310 may assist a delivery person in delivering a package to a specified or desired location. In such an instance, GPS data of the desired location such as, for example, a latitude, a longitude, and/or and altitude can be loaded onto the device 300, in some instances as NEMA formatted data. The GPS data may be loaded onto the device 300 at the direction of the carrier or in response to an identifier for the package scanned into the device 300 where, for example, the identifier may comprise a code from the package label scanned by a scanner (not shown) included on the device 300. When the GPS data is loaded, the device 300 is at a current location and the GPS sensor 310 engaged with the device 300 may determine GPS data corresponding to the current location. The device 300 may then be configured to direct the delivery person from the current location to the desired location, in some instances by determining a route between the two locations, such that the package can be delivered to the addressee. That is, the package can be delivered when the current location of the device 300 substantially corresponds to the desired location as determined from the GPS data for each location (e.g., when the delivery person arrives at the desired location). Various data may also be gathered along the route such as, for example, the elapsed time between points on a route or the elapsed time for the entire route. In addition, if the desired location is reached by the delivery person and the package is delivered, but the GPS data of the current and desired locations do not correspond, the device 300 may also be configured so as to allow the GPS data for the desired location to be modified or updated to the GPS data of the current location, where the altered data may also be transmitted to the carrier for universally updating the data for that desired location.

In a similar manner, in various embodiments, the GPS sensor 310 associated with the vehicle device 300 can identify inaccuracies or prevent mis-delivery of packages in a package delivery system. In most instances, delivery drivers rely on the destination addresses of packages in the delivery process. In various embodiments, the destination addresses of one or more packages on a delivery route are downloaded to the device 300 that the driver uses for his or her deliveries. To address the issue of mis-deliveries, the GPS sensor 310 of the device 300 can indicate to a delivery driver that he or she is about to deliver a package to an improper address. In particular embodiments, the delivery information downloaded to the device 300 may include GPS data having the latitude, longitude and/or altitude for package destination addresses. The GPS sensor 310 engaged with the device 300 can determine GPS data corresponding to the current location of the device 300 and can then direct the delivery person from the current location to the destination address, in some instances by determining a route between the two locations. Various data may also be gathered along the route such as, for example, the elapsed time between points on a route, the elapsed time for the entire route, or a particular time that the device 300 is at a specific location along the route. Therefore, when a delivery driver indicates to the device 300 that the package is about to be delivered to the destination address, the device 300 calculates the current GPS location based on signals received from the GPS and compares the current GPS location to the loaded GPS location associated with the package destination address. If the current GPS location does not match the loaded package destination GPS location, the device 300 notifies or alerts the delivery driver of a possible mis-delivery. For instance, in one embodiment, a possible mis-delivery notification occurs if the current GPS location of the driver is outside predetermined GPS data tolerance limits with respect to the package destination GPS location. For example, the tolerance limits may be based on the size of the service point created by linking delivery address information to the corresponding geographic information from the GPS data. Thus, in the example, the tolerance limits used are specific to the type of territory served. In particular embodiments, if a mis-delivery notification is triggered, indicating that the GPS data of the immediate location and destination address do not correspond within the tolerance limits, the delivery person may first perform a check to verify the destination address. If the delivery person confirms that the destination address is correct, the device 300 may be configured to allow the GPS data for the destination address to be modified or updated to the GPS data of the current location, where the altered data may also be transmitted to the carrier's system for universally updating the data for that destination address. In various embodiments, this can help to correct the package destination GPS location for use with future deliveries.

In addition to determining the position of a current location, in various embodiments, the GPS sensor 310 associated with the device 300 also allows a delivery route to be determined or accurately mapped. For example, it may often be the case in rural areas that a package destination address is not accurately depicted on a map. The device 300 having the GPS sensor 310 may help to minimize or substantially eliminate this problem by providing an accurate longitude, latitude, and/or altitude for each package delivery location or destination address. For instance, in one embodiment, pick-up and delivery data (including estimated location data) is checked and a central database (that may be located at the central system 104 depicted in FIG. 1) is continually updated with accurate latitude, longitude, and altitude for a location, whenever a package is delivered or picked up at that location. Further, the use of the same types of devices 300 on the delivery vehicles 103a, 103b, 103c in various embodiments provides uniform hardware and/or software that may contribute to the accuracy of the mapping of these delivery routes.

In addition, in various embodiments, the GPS sensor 310 associated with the device 300 may also be configured to record GPS data for a predetermined time interval. For example, in one embodiment, the GPS sensor 310 may be configured to record GPS data every second. This GPS data may be uploaded to the central database and may be used to trace the street path or network traveled to the destination during the delivery route. This trace information contributes additional accuracy to traditional street mapping in a manner that is also useful outside of parcel pickup and delivery such as, for example, in practically all GIS (geographic information systems). For example, this capability may allow for the tracing of roadways that are less frequently traveled by everyday traffic. In addition, the trace data is continually validated and updated as a byproduct of the GPS functionality in the device 300 as the various delivery routes are continuously traveled from day to day. Thus, any changes to these routes may be quickly recorded and, as a result, updated and accurate geographic information is provided as a product of a package delivery service. In addition, in various embodiments, as standardized addresses are added to the trace information, routing may become more accurate than calculations based on street path alone. For example, travel distances along driveways and private roads may be identified separately from street path travel to further characterize or profile a given geographic territory.

As shown in FIG. 3, in various embodiments, the vehicle device 300 includes a processor 315 that communicates with other components of the device 300. Similar to the operating object server 200, the processor 315 may be embodied in a number of different ways. For example, the processor 315 may be embodied as various processing means such as a processing element, a microprocessor, a coprocessor, a controller or various other processing devices including integrated circuits such as, for example, an application specific integrated circuit ("ASIC"), a field programmable gate array ("FPGA"), a hardware accelerator, or the like. Further, the processor 315 may be configured to execute instructions, whether configured by hardware or software methods, or by a combination thereof, and may represent an entity capable of performing operations according to embodiments of the present invention while configured accordingly. A display device/input device (not pictured) for receiving and displaying data may also be included in the device 300. This display device/input device may be, for example, a keyboard, pointing device, and/or a touch screen that is used in combination with a display. In addition, the device 300 may further include memory, which may include dynamic random access memory ("DRAM") 360 and non-volatile random access memory ("NVRAM") 370.

In addition, in various embodiments, the device 300 includes at least one storage device. In the particular embodiment shown in FIG. 3, the storage device is flash memory 380. However, the storage device described above may be any other type of computer-readable media, such as embedded or removable multimedia memory cards ("MMCs"), secure digital ("SD") memory cards, Memory Sticks, electrically erasable programmable read-only memory ("EEPROM"), hard disk, or the like. Additionally, the storage devices may be connected to the processor 315 by an appropriate interface.

Furthermore, a number of program modules (e.g., set of computer program instructions) may be stored on the storage device 380, within the NVRAM 370, and/or within DRAM 360. Such program modules may include an operating system 320 and a vehicle module 600. The vehicle module 600 may control certain aspects of the operation of the device 300 with the assistance of the processor 315 and operating system 320, although their functionality need not be modularized. Further, in various embodiments, some of the modules of the device 300, for example, may be described in the context of a package delivery. For instance, when a driver delivers a package to a consignee, the driver uses the GPS sensor 310 to obtain the GPS position information of the consignee's actual physical location. The driver uses a scanner (not shown) on the device 300 to capture the package tracking data from the package or packages to be delivered and retrieves the corresponding destination address from delivery information that was previously downloaded to the device 300 from the carrier via the WLAN and/or WWAN data radios 340, 330. The consignee GPS location information is then automatically compared against the geocode (latitude/longitude) of the destination address that had been gathered as part of the delivery information and stored in the carrier's system, and the driver is notified of a possible mis-delivery if the two positions are too far apart. Assuming a successful delivery, the database on the carrier's system may be either manually or automatically updated, over a network and using the WLAN data radio 340 or WWAN data radio 330, with the time and/or physical location of the delivery.

In addition, there may be instances, when a driver is collecting packages from a shipper, in which manifest information or other delivery information may be downloaded directly from the shipper's computer system, with the appropriate authorization and/or appropriate security precautions and considerations, to the device 300 via the WPAN data radio 350 and/or the IrDA communication port 390. If the shipper's location or other information has not already been obtained, the GPS sensor 310 may be directed to capture the latitude, longitude and/or altitude of the shipper's location and then transmit the GPS data and the manifest information or other information to a database on the carrier's system using the WLAN data radio 340 or the WWAN data radio 330. According to one embodiment, the WPAN data radio 350 and/or the IrDA communication port 390 may be used to obtain data from a shipper's computer without using a cable and without unduly interfering with or invading the shipper's databases or other files. The WPAN data radio 350 and/or the IrDA communication port 390 and/or the software or API therefore may be configured to interact with the shipper's computer and databases in a manner that limits the interaction to the needed information in the database. That is, the extent to which the WPAN data radio 350 and/or the IrDA communication port 390 interacts with the shipper's computer and databases is restricted, either by the operational parameters of the WPAN data radio 350 and/or the IrDA communication port 390 or by the parameters of the appropriate communication portion of the shipper's computer, only to the necessary data, thus preventing any excessive interference with or invasion into the shipper's private files or databases. In an era of growing privacy concerns, the use of the WPAN data radio 350 and/or the IrDA communication port 390 to obtain such a limited set of data prevents the inadvertent exposure or transmission of private customer data, since only the needed shipping data is accessed and transferred to the device 300, when and if necessary. In some situations, the information and/or files accessed by the WPAN data radio 350 and/or the IrDA communication port 390 in the shipper's computer may be tracked and the information gathered and prepared into a report, which may be periodically provided to the shipper.

In some instances, if a driver is working in an area where the GPS sensor 310 cannot operate, one or more of the wireless communication devices associated with the device 300 may be used to determine or validate the driver's location. More particularly, each WLAN data radio 340 and/or WPAN data radio 350 typically has a unique electronic address. As such, a driver's location may be validated by confirming that one or more of the wireless data radios in the device 300 are within a predetermined range of a particular wireless device previously accessed by the device 300 and associated with a consignee or shipper.

Further, in various embodiments, the device 300 may be configured to communicate with one or more data sensors on, for example, the delivery vehicle 103a, 103b, 103c, a building along a route, or about an operating facility. In some instances, sensors may be installed on or about the delivery vehicle 103a, 103b, 103c, such as on the engine, doors, and other electrical components of the vehicle so as to allow the device 300 to gather additional package delivery details. In a preferred embodiment, the sensors communicate with the device 300 and provide data such as, for example, when during the route the vehicle 103a, 103b, 103c was stopped and started, travel information such as speed and heading, the amount of time the driver was away from the vehicle 103a, 103b, 103c, and other information such as whether or when the doors of the vehicle 103a, 103b, 103c were opened and closed. This sensor information, coupled with the GPS location information, allows the carrier to accurately gather data about a driver's movement and actions during all of the tasks performed on a delivery route. In addition, for example, a delivery vehicle door sensor in combination with a GPS sensor 310 can also prevent the theft of packages by notifying the delivery driver or the carrier whenever the driver leaves the delivery vehicle area and the vehicle door is ajar or unlocked. In some instances, the vehicle 103a, 103b, 103c may be equipped with a control system (not shown) to receive and respond to a remote electronic instruction from the device 300 or the carrier's system so as to, for example, close and lock the doors, or the controller may be configured to determine and provide a response to the carrier in response to a query about the status of the vehicle 103a, 103b, 103c. In other instances, additional sensors may also be, for example, disposed on or about certain buildings or premises or about the carrier's hub, so as to provide further data.

c. Additional Exemplary System Components

In various embodiments, the central system 104 may also include components and functionality similar to that of the operating object server 200. For example, in one embodiment, the central system 104 includes one or more entities that may include: (1) a processor that communicates with other elements via a system interface or bus; (2) a display device/input device; (3) memory including both ROM and RAM; (4) a storage device; and (5) a network interface. It should be understood that these architectures are provided for exemplary purposes only and are not limiting to the various embodiments. The term "computing device" is used generically to refer to any computer, computing device, desktop, notebook or laptop, distributed system, server, gateway, switch, or other processing device adapted to perform the functions described herein.

III. EXEMPLARY SYSTEM OPERATION

Various embodiments of the present invention provide systems and methods that provide improved augmentation for GPS calculations. Further, various embodiments of the present invention provided systems and methods that identify the probability of an attribute being located along a segment of interest of a driving route. As described in greater detail below, such embodiments involve representing the segment of the driving route by patterns of speed variations obtained from GPS elements along the segment of the driving route and using the representation as input for functions representing various types of attributes to determine the probability of a particular type of attribute existing along the segment of the driving route.

Figure 4:
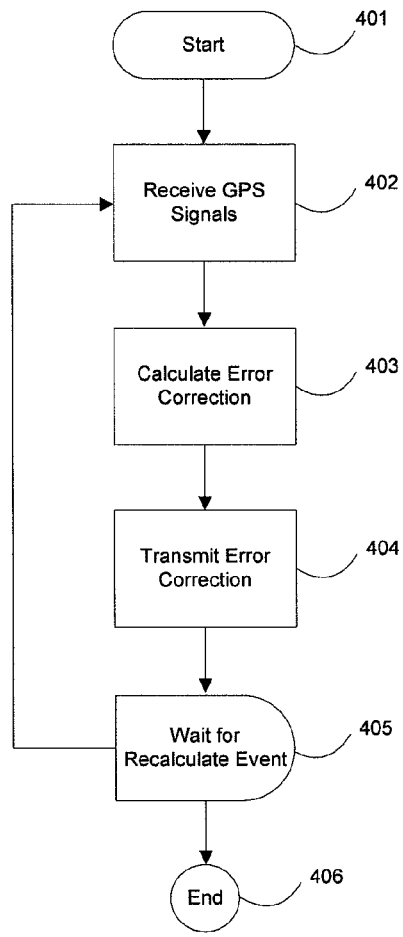
FIG. 4 shows a flow diagram of an error correction module according to one embodiment of the invention.
Figure 5:
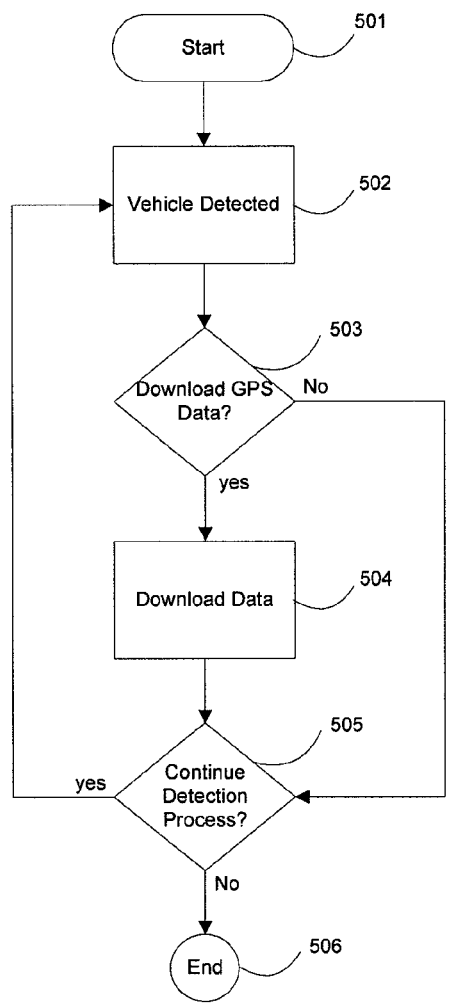
FIG. 5 shows a flow diagram of a data collection module according to one embodiment of the invention.
Figure 6:
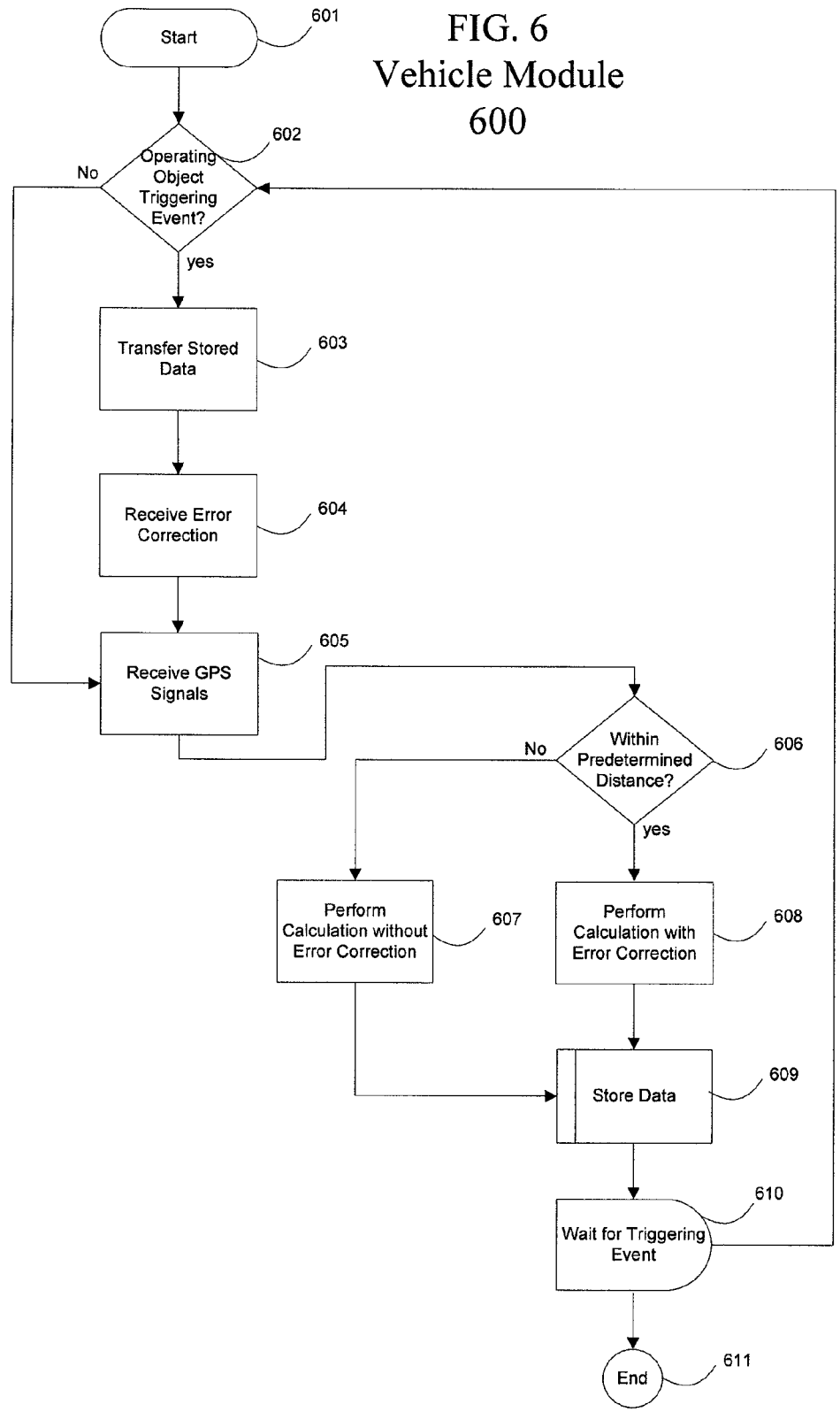
FIG. 6 shows a flow diagram of a vehicle module according to one embodiment of the invention.
Figure 7:
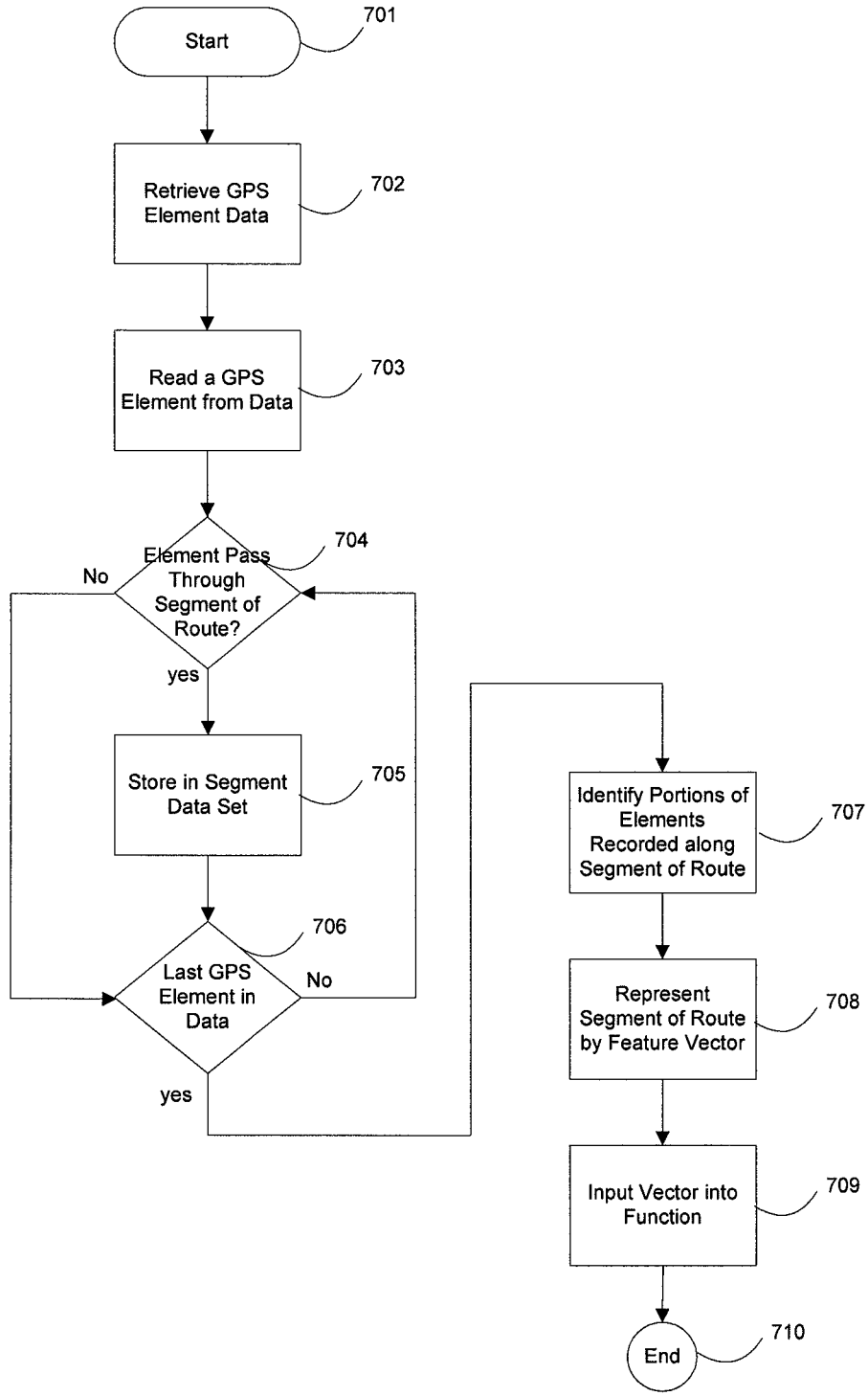
FIG. 7 shows a flow diagram of a point-of-interest module according to one embodiment of the invention.

Reference will now be made to FIGS. 4-7 which illustrate operations and processes as produced by these various embodiments. For instance, FIG. 4 provides a flow diagram of an error correction module 400 that calculates an error correction for use by GPS devices according to various embodiments. FIG. 5 provides a flow diagram of a data collection module 500 that downloads and collects GPS related data from a number of delivery vehicles 103a, 103b, 103c according to various embodiments. FIG. 6 provides a flow diagram of a vehicle module 600 that calculates a GPS location and stores and transfers GPS data according to various embodiments. Further, FIG. 7 provides a flow diagram of a point-of-interest module 700 that provides the probability of a type of attribute being located along a segment of a driving route according to various embodiments. These modules 400, 500, 600, 700 are described in greater detail below.

a. Error Correction Module

As previously discussed, in various embodiments, the operating object server 200 may include an error correction module 400 that is configured to calculate an error correction to be used in various GPS calculations. In particular embodiments, the operating object server 200 is located at a particular operating object 102a, 102b, 102c within the carrier's delivery network. For example, the particular operating object 102a, 102b, 102c may be a operating center within the carrier's network used as a distribution center where delivery vehicles 103a, 103b, 103c are loaded and unloaded with packages to be delivered along any number of delivery routes. Once the vehicle 103a, 103b, 103c is loaded, the vehicle 103a, 103b, 103c leaves the operating center and proceeds along a particular delivery route to deliver the packages to their intended recipients.

As previously described, in various embodiments, the particular operating object 102a, 102b, 102c has a GPS device associated with the object 102a, 102b, 102c. For instance, in one example in which the operating object 102a, 102b, 102c is an operating center, the GPS device may be affixed to an antenna placed on the roof of the operating center. In another example, the GPS device may not be affixed directly to the operating center but may be in close proximity with the operating center and may be in communication with the operating center. For instance, the GPS device may be affixed to a tower on elevated property close to the operating center. Further, according to various embodiments, the GPS device may include the functionality of the operating object server 200. Therefore, in these particular embodiments, the GPS device and operating object server 200 is essentially the same device. However, in other embodiments, the GPS device and the operating object server 200 are two distinct components that are in electronic communication with one another.

FIG. 4 illustrates a flow diagram of the error correction module 400 according to various embodiments. This flow diagram may correspond to the steps carried out by the processor 60 in the operating object server 200 shown in FIG. 2 as it executes the module 400 in the server's RAM memory 67 according to various embodiments.

As previously described, in various embodiments, the GPS device is configured to receive GPS signals sent out by multiple satellites 101a, 101b, 101c that make up a part of a global position system (GPS). In the embodiments in which the GPS device and the operating object server 200 are two distinct components, the GPS device sends the signals to the operating object server 200 over the communication channel. Therefore, in Step 402, the error correction module 400 residing on the operating object server 200 receives the GPS signals. In response, the module 400 calculates an error correction based on the location derived from the GPS signals and the known location of the particular operating object 102a, 102b, 102c, shown as Step 403. As previously described, the error correction module 400 determines the location of the GPS device associated with the operating object 102a, 102b, 102c based on the GPS signals received from the GPS device and compares the location with the known location of the device associated with the operating object 102a, 102b, 102c. The error correction module 400 then uses the difference between the two locations to calculate an error correction for the GPS signal.

Once, the error correction module 400 has calculated the error correction, the module 400 transmits the correction, shown as Step 404. For instance, in one embodiment, the error correction module 400 communicates the error correction to the GPS device and the device transmits the error correction over a closed wireless communication channel or over an open wireless communication channel (e.g., the GPS device broadcasts the error correction). As a result, vehicle devices 300 (e.g., DIADs residing in delivery vehicles 103a, 103b, 103c) traveling within a predetermined distance from the operating object 102a, 102b, 102c may receive the error correction and may use the correction for subsequent GPS calculations. Therefore, in various embodiments, as the delivery vehicles 103a, 103b, 103c travel on their delivery routes, the vehicle devices 300 in the vehicles 103a, 103b, 103c use the error correction to augment GPS locations determined along the routes. Furthermore, in various embodiments, the vehicle devices 300 located in the vehicles 103a, 103b, 103c may also be configured to transmits (e.g., broadcast) the error correction so that other GPS devices within the vicinity of the vehicles 103a, 103b, 103c may make use of the error correction to augment GPS calculations preformed by these devices. Thus, in these particular embodiments, personal vehicles (such as passenger cars) that have GPS navigation systems and that are traveling near the delivery vehicles 103a, 103b, 103c may also make use of the error correction calculated by the error correction module 400.

Returning to FIG. 4, the error correction module 400 waits for some type of "triggering" event to occur to recalculate the error correction, shown as Step 405. For instance, in particular embodiments, the error correction module 400 may be configured to wait a predetermined period of time before recalculating the error correction. For example, the error correction module 400 may be configured to recalculate the error correction every two hours, twice a day, or every two days. In particular embodiments, the predetermined period of time may depend on such information as the amount of error detected during the previous calculation or the current season (e.g., winter, spring, summer, fall). In other embodiments, the error correction module 400 may be configured to recalculate the error correction based on the detection of some parameter. For instance, the error correction module 400 may receive the current weather conditions communicated from measuring components (e.g., thermometer, wind gauge, and/or barometer) located at the operating object 102a, 102b, 102c and the module 400 may be configured to recalculate the error correction when certain weather conditions are detected such as precipitation (e.g., rain or snow). While in other embodiments, the error correction module 400 may be configured to recalculate the error correction based on the occurrence of any number of "triggering" events or the occurrence of a combination of "triggering" events. Thus, once the error correction module 400 detects the "triggering" event, the module 400 returns to Step 402 to re-perform the steps necessary to recalculate the error correction. The error correction module 400 continues this loop unless the module 400 is halted.

It should be noted that in various embodiments of the invention an error correction is not only provided by one operating object 102a, 102b, 102c within the carrier's delivery network, but by a number of operating objects 102a, 102b, 102c within the carrier's delivery network. For instance, as previously discussed, UPS® has approximately 60,000 retail locations in 200 countries and territories and approximately 1,800 operating facilities in 120 countries. Therefore, in various embodiments, if UPS® were to transmit error correction messages from a great number of these locations this could provide error correction for GPS calculations conducted over a very large area covering these countries. As a result, a greater number of more accurate GPS calculations may be carried out in these countries.

b. Data Collection Module

Another aspect of various embodiments of the invention is that because the carrier has a large number of delivery vehicles 103a, 103b, 103c traveling over a number of delivery routes covering a large area, the delivery vehicles 103a, 103b, 103c are able to collect GPS data for this area. In addition, because a carrier's delivery vehicles 103a, 103b, 103c are dispatched almost daily in many instances over the delivery routes that cover this area, the frequency at which GPS data can be collected can be very high. For example, UPS® has a delivery fleet that includes approximately 96,000 package cars, vans, tractors, and motorcycles. In addition, UPS®'s service area includes more than 200 countries and territories, including every address in North America and Europe. Therefore, in this example, if UPS® were to collect GPS data using a great number of its delivery fleet over a frequent time period (e.g., daily), the amount of GPS data would provide a higher level of precision than normally available with regard to GPS locations and renderings.

One area that may benefit greatly from this amount of data is geographic information systems (GIS). A GIS is any system that captures, stores, analyzes, manages, and presents data that are linked to location. Many GIS are used in such areas as cartography, remote sensing, land surveying, utility management, natural resource management, photogrammetry, geography, urban planning, emergency management, navigation, and localized search engines. Therefore, in short, a GIS is any system that integrates, stores, edits, analyzes, shares, and displays geographic information.

Many modern GIS technologies make use of digital information. A common source of digital information is transforming a hard copy map or survey plan into a digital medium through the use of computer-aided design (CAD) programs. However, this method may only be as reliable as the age of the map or survey plan being used. This is because as many of these maps and survey plans become older, their representation of the landscape they represent becomes less accurate as the landscape changes. Another common source of information is heads-up digitizing. Heads-up digitizing involves the tracing of geographic data directly on top of aerial imagery. Similar to transforming maps and survey plans, the reliability of this method is dependent on the accuracy and recency of the aerial imagery. Therefore, in many instances, GIS accuracy depends greatly upon the source data.

In generally, any variable that can be located spatially can be fed into a GIS. Therefore, locations that are represented by x, y, and z coordinates of longitude, latitude, and elevation may be used as data for a GIS. Further, many GIS may be configured to receive data from databases or other types of data sources. As a result, GPS data is another common source of data that may be used in many GIS. Thus, the amount and frequency of GPS data that may be provided in various embodiments of the invention may be advantageous for many GISs. For example, changes to landscapes, such as the addition of a new point of interest (e.g., new restaurant), may be reflected quickly in a GIS.

In addition, an advantage that may be realized in various embodiments as a result of the collection of numerous GPS data is that the accuracy of determining the exact location of an object along a delivery (e.g., a residential home's location) may be greatly improved. For instance, a delivery vehicle 103a, 103b, 103c may travel the same delivery route daily and collect GPS data as the vehicle 103a, 103b, 103c travels the route. Therefore, GPS data is collected daily for a particular location along the route (e.g., a residential home) providing multiple GPS location readings for the particular location. These multiple GPS location readings may then be analyzed statistically to determine the GPS location reading that is most likely the correction location reading the particular location. Thus, in various embodiments, the collection of multiple GPS location readings for various objects along the delivery route may allow for a more accurate determination of the actual location of the various objects.

Therefore, in various embodiments, the operating object server 200 may also include a data collection module 500 that is configured to collection GPS data from a number of vehicle devices 300 (e.g., DIADs residing in delivery vehicles 103a, 103b, 103c). As is explained in greater detail below, a number of delivery vehicles 103a, 103b, 103c may be dispatched daily over a plurality of delivery routes to deliver packages. During this time, a GPS-enabled vehicle device 300 (e.g., DIAD) located in a vehicle 103a, 103b, 103c may be configured to receive and record GPS data as the vehicle 103a, 103b, 103c travels over its delivery route. In particular embodiments, the device 300 may be configured to receive and record GPS data for a predetermined time interval or when a "triggering" event occurs. For instance, in one embodiment, the device 300 may be configured to receive and record GPS data every second while the vehicle 103a, 103b, 103c is in motion. In another embodiment, the device 300 may be configured to receive and record GPS data when a certain event is detected, such as the vehicle 103a, 103b, 103c stopping so that the driver may make a delivery. While in other embodiments, the device 300 may be configured to receive and record GPS data based on the occurrence of any number of "triggering" events or the occurrence of a combination of "triggering" events. Thus, the delivery vehicle 103a, 103b, 103c may record and store GPS data during its daily route and then return to an operating object 102a, 102b, 102c (e.g., an operating center) after completing deliveries.

Accordingly, FIG. 5 illustrates a flow diagram of the data collection module 500 according to various embodiments. This flow diagram may correspond to the steps carried out by the processor 60 in the operating object server 200 shown in FIG. 2 as it executes the module 500 in the server's RAM memory 67 according to various embodiments. However, similar to the error correction module 400, in other embodiments the data collection module 500 may reside on a GPS device associated with an operating object 102a, 102b, 102c when the GPS device is configured to carry out the functionality of the operating object server 200.

Begin with Step 502, the data collection module 500 detects a delivery vehicle 103a, 103b, 103c that is within a predetermined distance from the operating object 102a, 102b, 102c the module 500 is associated with. For example, in particular embodiments, the predetermined distance may equate to a distance at which GPS data may be transferred from a vehicle device 300 on a delivery vehicle 103a, 103b, 103c (e.g., a DIAD residing in the delivery vehicle 103a, 103b, 103c) to a GPS device associated with the operating object 102a, 102b, 102c. In particular, a delivery vehicle 103a, 103b, 103c may be returning to an operating center after completing its daily delivery route. In this particular instance, a vehicle device 300 in the delivery vehicle 103a, 103b, 103c may transmit a "beacon" (e.g., transmit a message identifying the vehicle device 300 and/or vehicle 103a, 103b, 103c) that is detected by the GPS device associated with the operating center. The GPS device may then send a message to the data collection module 500 informing the module 500 that the vehicle device 300 in the delivery vehicle 103a, 103b, 103c is within the predetermined distance from the operating center.

Accordingly, in Step 503, the data collection module 500 determines whether the vehicle 103a, 103b, 103c has GPS data to download. For instance, in one embodiment, the "beacon" message also includes an indicator that the vehicle 103a, 103b, 103c has GPS data to download (e.g., an alphanumeric character that appears in the message indicating the vehicle 103a, 103b, 103c has GPS data to download). In this particular embodiment, the data collection module 500 determines from the message sent from the GPS device that the vehicle 103a, 103b, 103c has GPS data to download. In another embodiment, the delivery vehicle 103a, 103b, 103c may simply begin to transmit the data after it is within a predetermined distance from the operating center. In this particular embodiment, the data collection module 500 determines that the vehicle 103a, 103b, 103c has GPS data to download when the module 500 simply begins to receive the data.

Therefore, if the data collection module 500 determines the vehicle 103a, 103b, 103c has GPS data to download the module 500 begins to download the data, shown as Step 504. In various embodiments, this may involve the vehicle device 300 in the vehicle 103a, 103b, 103c transmitting the GPS data over a wireless communication channel such as, for example, WPAN, WLAN, WMAN, and BWA. In these particular embodiments, the GPS device associated with the operating center may be configured to receive these transmissions and to communicate these transmissions to the data collection module 500. It should be understood that wireless communication channels may not be the only type of communication used to download the GPS data. For instance, in various embodiments, the delivery vehicle 103a, 103b, 103c may download the GPS data over a wired communication channel. For example, in one embodiment, the vehicle device 300 located in the delivery vehicle 103a, 103b, 103c may be carried from the vehicle 103a, 103b, 103c to an input terminal wherein the device 300 is plugged into the terminal and the GPS data is downloaded directly into the data collection module 500. Thus, in this particular embodiment, the data collection module 500 may not be configured to detect the vehicle 103a, 103b, 103c or to determine whether the vehicle 103a, 103b, 103c has GPS data to download.

Returning to FIG. 5, in various embodiments, the downloading of the GPS data involves the data collection module 500 transferring the data to some type of data storage. For instance, in one embodiment, the data collection module 500 is configured to download the data to a central system 104 within the carrier's delivery network. As previously described, the central system 104 may include one or more storage media for storing the GPS data. Further, in particular embodiments, the storage of the data may involve storing the data in one or more databases that reside on the storage media. Therefore, in various embodiments, the GPS data may be easily made available to a number of parties by storing the GPS data received from all of the delivery vehicles 103a, 103b, 103c in a central location. For example, in an instance in which a GIS uses this data as input, the GIS may simply gain access to all of the GPS data collected by the various vehicle devices 300 in the delivery vehicles 103a, 103b, 103c through the one or more databases residing on the central system 104. However, it should be understood that the downloaded GPS data does not necessarily need to be centrally stored. For instance, each operating object 102a, 102b, 102c may have some type of storage media to store the GPS data instead of or in addition to the storage media residing in the central system 104. Further, the GPS data may be packaged up and provided to entities independent of the carrier. For example, the carrier may record the GPS data onto one or more portable data storage devices to provide and/or may transmit the data to parties such as a web mapping provider (e.g., Google Maps® and Bing™ Maps) and/or a GPS service provider (e.g., Garmin® and Tom-Tom®) for a fee.

Finally, in Step 505, the data collection module 500 determines whether to continue the detection process. For instance, in particular embodiments, the data collection module 500 determines whether the GPS device associated with the operating center is working properly and/or whether the module 500 has received an indication to halt the detection process from an individual or from another module. If the data collection module 500 determines to continue the detection process, the module 500 returns to Step 502.

c. Vehicle Module

As described above, in various embodiments, delivery vehicles 103a, 103b, 103c may be equipped with GPS enabled devices (e.g., vehicle devices 300). According to various embodiments, a vehicle device 300 may be affixed to a vehicle 103a, 103b, 103c or may be a portable device that is carried by the driver such as a DIAD. Therefore, in various embodiments, the vehicle device 300 may include a vehicle module 600 that is configured to perform GPS functionality. Accordingly, FIG. 6 illustrates a flow diagram of the vehicle module 600 according to various embodiments. For instance, this flow diagram may correspond to the steps carried out by the processor 315 in the vehicle device 300 shown in FIG. 3 as it executes the module 600 in the device's DRAM memory 360 according to various embodiments.

As previously described, in various embodiments, the vehicle device 300 in the vehicle 103a, 103b, 103c may be configured to transmit GPS data over a wireless communication channel to an operating object 102a, 102b, 102c. Therefore, in these particular embodiments, the vehicle module 600 determines whether the module 500 has detected a "triggering" event to download the GPS data, shown as Step 602. For instance, in one embodiment, the vehicle device 300 in the vehicle 103a, 103b, 103c may be configured to transmit a "beacon" message that is detected by an operating object 102a, 102b, 102c and the vehicle device 300 receives a message in return from the operating object 102a, 102b, 102c informing the vehicle device 300 that the "beacon" message has been detected and requesting the vehicle device 300 to transmit available GPS data. Thus, in this particular embodiment, the "triggering" event is the receipt of the request to transmit the available GPS data.

In another embodiment, the vehicle module 600 may simply determine whether the vehicle device 300 in the vehicle 103a, 103b, 103c is within a predetermined distance from the operating object 102a, 102b, 102c. For instance, in this particular embodiment, the vehicle module 600 may have access to the location of one or more operating objects 102a, 102b, 102c and the vehicle module 600 calculates the distance between the location of the operating objects 102a, 102b, 102c and the current location of the vehicle 103a, 103b, 103c based on a previous GPS calculation. Therefore, in this embodiment, the "triggering" event is the determination that the distance between the two locations is within the predetermined distance. Yet, in another embodiment, the GPS device associated with the operating object 102a, 102b, 102c transmits a message that identifies the operating object 102a, 102b, 102c. For example, the message may include information that identifies the operating object 102a, 102b, 102c along with additional information, such as an error correction for GPS calculations. Therefore, in this particular embodiment, the "triggering" event is the detection of this message. While in other embodiments, the "triggering" event may be based on the occurrence of any number of events or on the occurrence of a combination of events.

If the vehicle module 600 determines a "triggering" event has occurred, the module 600 transfers the stored GPS data to the operating object 102a, 102b, 102c, shown as Step 603. As previously described, this may entail the vehicle device 300 located in the vehicle 103a, 103b, 103c transmitting the GPS data over a wireless communication channel to the GPS device associated with the operating object 102a, 102b, 102c. In addition, in various embodiments, the vehicle module 600 may also receive an error correction over the wireless communication channel, shown as Step 604. Therefore, in these particular embodiments, the operating object 102a, 102b, 102c in communication with the vehicle 103a, 103b, 103c transmits the error correction over the communication channel to the vehicle 103a, 103b, 103c.

It should be noted that in particular embodiments, the carrier's delivery network may be divided into error correction zones. That is, an error correction zone may represent a particular portion of one or more delivery routes. Further, in these particular embodiments, a zone may be associated with a particular operating object 102a, 102b, 102c. Therefore, as the delivery vehicle 103a, 103b, 103c travels along its delivery route, the vehicle 103a, 103b, 103c may travel from one error correction zone to another error correction zone. At this point, the vehicle module 600 may be configured to obtain an error correction for the new zone from the operating object 102a, 102b, 102c associated with the new zone. In particular embodiments, the vehicle module 600 may have access to data that aids the module 600 in determining when the vehicle 103a, 103b, 103c travels from one error correction zone into a new error correction zone. For instance, in one embodiment, data representing a map indicating the different zones is stored on the vehicle device 300 and based on the last calculated position of the vehicle 103a, 103b, 103c, the vehicle module 600 determines whether the vehicle 103a, 103b, 103c has passed into a new zone and needs to obtain an error correction for the new zone. Further, it should be noted that the detection of moving into a new error correction zone may also serve as a "triggering" event in various embodiments for downloading GPS data.

Returning to FIG. 5, in Step 605, the vehicle module 600 receives GPS signals from one or more of the satellites 101a, 101b, 101c within the global positioning system (GPS). As previously described, the vehicle device 300 in the vehicle 103a, 103b, 103c may include a GPS sensor 310 for detecting the GPS signals, and these signals may be communicated to the vehicle module 600. In response, the vehicle module 600 determines whether the vehicle 103a, 103b, 103c is within a predetermined distance from the operating object 102a, 102b, 102c from which the module 600 received the error correction, shown as Step 606. As previously explained, the error correction in various embodiments is based on the known location and the GPS calculated location of a GPS device associated with the operating object 102a, 102b, 102c. Therefore, as the vehicle 103a, 103b, 103c (and the vehicle device 300) travels away from the operating object 102a, 102b, 102c, the error correction may become less applicable. Therefore, the vehicle module 600 determines whether the vehicle 103a, 103b, 103c is still within a range in which the received error correction may still be used in a GPS calculation.

For instance, in one embodiment, the location of the operating object 102a, 102b, 102c is received along with the error correction from the operating object 102a, 102b, 102c. In this particular embodiment, the vehicle module 600 may be configured to determine whether the current location of the vehicle 103a, 103b, 103c determined from the previous GPS calculation is within a predetermined distance from the location of the operating object 102a, 102b, 102c. If the vehicle 103a, 103b, 103c is within the predetermined distance, the vehicle module 600 performs the GPS calculation with the error correction, shown as Step 608. However, if the vehicle 103a, 103b, 103c is not within the predetermined distance, the vehicle module 600 instead performs the GPS calculation without using the error correction, shown as Step 607. In various embodiments, once the vehicle module 600 has performed the GPS calculation, the module 600 stores the GPS data on the device so that is may be later transferred to an operating object 102a, 102b, 102c, shown as Step 609. In addition, in particular embodiments, the module 600 may also store an indicator as to whether an error correction was used or not in the calculation.

Finally, in various embodiments, the vehicle module 600 may be configured to re-perform its functionality after a "triggering" event occurs, shown as Step 610. For instance, the "triggering" event may simply be an indication received from an operating object 102a, 102b, 102c to download the GPS data. In addition, "triggering" events may include such events as a time interval elapsing indicating that a subsequent GPS calculation should be performed. For example, the vehicle module 600 may be configured to perform a GPS calculation every second while the vehicle 103a, 103b, 103c is in motion. "Triggering" events may also include the detection of certain sensor events. As previously described, in particular embodiments, the GPS vehicle device 300 in the vehicle 103a, 103b, 103c may be configured to communicate with one or more data sensors on, for example, the delivery vehicle 103a, 103b, 103c, a building along the delivery route, or about an operating facility. Thus, in these particular embodiments, a "triggering" event may include the detection of data from one or more of these sensors. Therefore, in various embodiments, once the vehicle module 600 detects a "triggering" event, the vehicle module 600 returns to Step 602.

It should be noted that in various embodiments, the vehicle device 300 located in the vehicle 103a, 103b, 103c may be configured to broadcast the error correction as the vehicle 103a, 103b, 103c travels along its delivery route so that other GPS enabled devices in the area may make use of the error correction. Therefore, in these particular embodiments, the vehicle module 600 may be configured to instruct the vehicle device 300 to broadcast the error correction if the module 600 determines the error correction is still applicable. In addition, in various embodiments, the vehicle module 600 may be configured to include additional data along with the GPS data transferred to the operating object 102a, 102b, 102c. For example, data collected from one or more sensors on the vehicle 103a, 103b, 103c may be included along with the GPS data transferred to the operation object 102a, 102b, 102c. In another example, in instances in which the vehicle device 300 may be a DIAD, the delivery driver may carry the DIAD away from the vehicle 103a, 103b, 103c while making some deliveries. In particular situations, the delivery location may not be "visible" to GPS. For instance, the driver may be making a delivery to a store located inside an indoor mall. Therefore, once the driver enters the mall, the DIAD being carried by the driver is no longer visible to GPS. In this particular instance, the DIAD may be configured to trace the driver's route within the mall using other methods such as dead reckoning based on the current location of the delivery vehicle 103a, 103b, 103c. Therefore, this information may be stored on the DIAD along with the GPS data gathered during the deliveries and transferred along with the GPS data to an operating object 102a, 102b, 102c. This additional information may then be used, for example, by a GIS to better map out locations that are not necessary visible in GPS. In addition, such information may be helpful in better determining the actual address of many of locations that are not necessarily visible to GPS.

d. Point-of-Interest Module

As previously described, in various embodiments of the invention, the delivery vehicles 103a, 103b, 103c (e.g., vehicle devices 300) are able to collect GPS data over a large area and at a high frequency. As also previously described, an advantage that may be realized in various embodiments as a result of the collection of numerous GPS data is that the accuracy of determining the exact location of a relevant attribute along a delivery (e.g., a residential home's location) may be greatly improved. In addition to improving the accuracy of locating relevant attributes (e.g., objects) along a delivery route, another advantage that may be realized in various embodiments is the identification of relevant attributes along the delivery route. For instance, various embodiments of the invention may include a point-of-interest module 700 that is configured to provide the probability of a type of attribute being located along a portion (e.g., point-of-interest) of a delivery route. As discussed in greater detail below, in particular embodiments, this module 700 is configured to analyze GPS element data that is collected along a segment of a route, such as a segment of a route around an attribute such as an intersection, a speed bump, and/or a reduced speed zone such as a school zone, and to categorize the attribute located along the segment of the route such that the module 700 can provide the probability that a particular type of attribute is present along the segment of the route.

For the purposes of this disclosure, a GPS element (comprising a sequence of GPS data points) corresponds to a trace of a geographic position, specifying the location of a GPS enabled device 300 (such as a DIAD or vehicle mounted device) at a given time. In various embodiments, these GPS elements may be collected over a period of time (such as a three-month period, for example) along a particular segment of a route. For instance, in particular embodiments, one or more delivery vehicles 103a, 103b, 103c may collect a plurality of elements along the segment of the route by utilizing the vehicle module 600 previously described. Thus, in these particular embodiments, the GPS enabled devices 300 on individual delivery vehicles 103a, 103b, 103c record the GPS element points during individual delivery trips as they pass along the segment of the route. As a result, a delivery trip produces a sequence of GPS data points (e.g., a GPS element). This data may then be utilized by the point-of-interest module 700 to provide probabilities regarding the likelihood of various types of attributes existing along the particular segment of the route. FIG. 7 illustrates a flow diagram of the point-of-interest module 700 according to various embodiments. This flow diagram may correspond to the steps carried out by the processor 60 in the operating object server 200 shown in FIG. 2 as it executes the module 700 in the server's RAM memory 67 according to various embodiments. Although it should be understood that this particular module 700 may reside on other devices and/or in other systems. For instance, the GPS element data may be provided for the segment of the route to an external customer (such as a GIS) who may make use of a point-of-interest module 700 and the GPS element data to identify attributes located along a segment of the route. However, for purpose of this disclosure, the point-of-interest module 700 resides on the operating object server 200 previously described.

Therefore, turning to FIG. 7, the point-of-interest module 700 retrieves the GPS element data collected over a particular time period, shown as Step 702. For instance, in one particular embodiment, the point-of-interest module 700 queries the GPS element data from one or more centrally located databases (e.g., one or more databases located at the central system 104 previously described) in which the GPS data recorded by the delivery vehicles 103a, 103b, 103c is stored.

In various embodiments, the initial functionality carried out by the point-of-interest module 700 is to prepare a GPS data set to be use in the identification process. This functionality general involves identifying the GPS elements from the data that were recorded near the particular segment of the route. Thus, in Step 703, the point-of-interest module 700 reads the first GPS element from the GPS element data. In Step 704, the module 700 then determines whether the GPS element is collected from a delivery vehicle 103a, 103b, 103c that has passed along the particular segment of the route. For instance, in one embodiment, the point-of-interest module 700 may identify the particular delivery vehicle 103a, 103b, 103c associated with the GPS element and may identify the particular route the delivery vehicle 103a, 103b, 103c was traveling during the recording of the GPS element. From the route information, the point-of-interest module 700 then determines whether the delivery vehicle 103a, 103b, 103c passed along the particular segment of interest for the route. If the element was not collected from a delivery vehicle 103a, 103b, 103c that passed along the segment of interest for the route, the point-of-interest module 700 skips to Step 706 and determines whether the current GPS element is the last element in the GPS data.

However, if the point-of-interest module 700 determines the GPS element is a element for a delivery vehicle 103a, 103b, 103c that passed along the segment of interest for the route, the module 700 saves the element to a data set for the segment of the route, shown as Step 705. According to various embodiments, the point-of-interest module 700 may be configured to save the data set in temporary storage and/or in permanent storage. For instance, the point-of-interest module 700 may save the GPS element to temporary storage residing on the server 200 or may save the GPS element to permanent storage on storage media located at the central system 104.

Next, the point-of-interest module 700 determines whether the current GPS element is the last element in the GPS data, shown as Step 706. If the current GPS element is not the last element in the GPS data, the point-of-interest module 700 returns to Step 703, reads the next GPS element in the data, and repeats the process to determine whether the next GPS element is a an element for a delivery vehicle 103a, 103b, 103c that passed along the segment of interest for the route.

However, if the current GPS element is the last element in the GPS data, the point-of-interest module 700 identifies the portion of each identified element that was recorded along the segment of interest for the route, shown as Step 707. In particular embodiments, this is accomplished by the point-of-interest module 700 producing a topology of the road network from the set of GPS elements identified for the segment of the route. Next, the module 700 draws a rectangle to encompass at least a portion of the segment of interest in order to define a boundary. As a result, in various embodiments, only GPS element points located inside of this boundary are used as input for the classification.

Depending on the type of attribute that may be present along the segment of interest in the route, the speed of a vehicle (or a GPS unit) under normal traffic conditions may typically decrease as the vehicle/unit approaches various segments of a route and the speed may typically increase as it leaves the various segments. Various embodiments of the point-of-interest module 700 make use of speed variation to identify points-of-interest. For instance, the average amount of time between slowing down and speeding up may be relatively longer for a traffic light controlled segment of the route than for a stop sign controlled segment of the route. Thus, in various embodiments, the point-of-interest module 700 may be configured to compute speed variables for a number of speed samples (e.g., 50) from each of the GPS elements in the segment boundary at those points. For example, in one embodiment, the point-of-interest module 700 may estimate the elapsed time during traversal of the segment of the route and may sample the element points at the time interval.

Returning to FIG. 7, in various embodiments, the point-of-interest module 700 represents the segment of the route by a (multi-dimensional) feature vector capturing speed variation, shown as Step 708. More specifically, in various embodiments, the feature representation method that may be developed uses speed variation patterns as a feature vector. For instance, in one particular embodiment, the point-of-interest module 700 samples a number of speed variables (e.g., 50) obtained from each of the GPS elements associated with the segment of the route and the module 700 uses the average value of the speed variables as a feature vector after normalization.

Next, the point-of-interest module 700 classifies the segment of the route based on its speed variation obtained from the GPS elements. A number of different attributes may be considered in various embodiments. For instance, the point-of-interest module 700 may be considering whether the segment of the route has a traffic control such as a traffic light, a stop-sign, a yield sign, mixed traffic signs, a speed bump, a reduced speed zone, and/or an uncontrolled intersection. Thus, returning to FIG. 7, this is accomplished in various embodiment by the point-of-interest module 700 inputting the segment of the route as an m-dimensional feature vector (e.g., $x_i \in R^m$) into a function, $f(x_i)$, and outputting a prediction of the attribute present along the segment, $\hat{c}_i$, shown as Step 709. In order to learn these functions for individual attributes in various embodiments, histograms may be used that have been utilized to estimate an unknown function.

e. Additional Comments

It should be understood that the functionality of various modules 400, 500, 600, 700 described above may be combined or separated in particular embodiments. For instance, in various embodiments, the functionality as described above with respect to the error correction module 400 and the data collection module 500 may be combined into one module or separated into multiple modules. Therefore, the descriptions of the various modules 400, 500, 600, 700 are provided above as they relate to the functionality performed by various embodiments of the invention and should not be construed to limit the scope of the claimed invention.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for providing a prediction of a type of attribute located along a segment of a driving route based on one or more speed variation patterns obtained from Global Positioning System (GPS) elements, the method comprising the steps of:
   (a) retrieving a plurality of GPS elements;
   (b) for each GPS element that corresponds to one or more positions along the segment of the driving route, identifying a portion of the GPS element recorded along the segment to include in an input GPS set;
   (c) representing, via a processor, the segment of the driving route by a multi-dimensional feature vector capturing the one or more speed variation patterns; and
   (d) inputting the multi-dimensional feature vector into a function for the type of attribute and in response to analyzing the multi-dimensional feature vector input in the function, determining the prediction indicating whether an object of the type of attribute is physically located along the segment of the driving route.

2. The method of claim 1, wherein the multi-dimensional feature vector being configured based on one or more data points of the input GPS set.

3. The method of claim 1, wherein the attribute comprises at least one of a traffic light, a stop sign, a yield sign, a speed bump, a reduced speed zone, or mixed traffic signals.

4. The method of claim 1, wherein step (b) further comprises the sub-steps of:
   producing a topology from the GPS elements that pass along the segment of the driving route;
   drawing a rectangle to encompass at least a portion of the segment of the driving route to define a boundary; and
   including in the input GPS set the GPS data points located inside the boundary from the portions of the GPS elements that pass along the segment of the driving route.

5. The method of claim 1, wherein the multi-dimensional feature vector comprises an average value of M number of speed variables sampled from each of the GPS elements associated with the segment of the driving route.

6. The method of claim 1, wherein the multi-dimensional feature vector being configured further comprises configuring the multi-dimensional feature vector based in part on sampling a plurality of speed variables obtained from the GPS elements associated with the segment of the driving route.

7. A system for providing a prediction of a type of attribute located along a segment of a driving route based on one or more speed variation patterns obtained from Global Positioning System (GPS) elements, the system comprising:
   at least one computer processor configured to:
   (a) retrieve a plurality of GPS elements;
   (b) for each GPS element that corresponds to one or more positions along the segment of the driving route, identify a portion of the GPS element recorded along the segment of the driving route to include in an input GPS set;
   (c) represent the segment of the driving route by a multi-dimensional feature vector capturing the one or more speed variation patterns; and
   (d) input the multi-dimensional feature vector into a function for the type of attribute and in response to analyzing the multi-dimensional feature vector input in the function, determining the prediction indicating whether an object of the type of attribute is physically located at the segment of the driving route.

8. The system of claim 7, wherein the multi-dimensional feature vector being configured based on one or more data points of the input GPS set.

9. The system of claim 7, wherein the attribute comprises a traffic light, a stop sign, a yield sign, a speed bump, a reduced speed zone, or mixed traffic signals.

10. The system of claim 7, wherein the at least one computer processor is configured to identify the GPS elements that pass along the segment of the driving route and the portions of the GPS elements that pass along the segment of the driving route recorded along the segment of the driving route by:
    producing a topology from the GPS elements that pass along the segment of the driving route;
    drawing a rectangle to encompass at least a portion of the segment of the driving route to define a boundary; and
    including in the input GPS set the GPS data points located inside the boundary from the portions of the GPS elements that pass along the segment of the driving route.

11. The system of claim 7, wherein the multi-dimensional feature vector comprises an average value of M number of speed values sampled from each of the GPS elements associated with the segment of the driving route.

12. The system of claim 7, wherein the at least one computer processor is further configured to:
    configure the multi-dimensional feature vector based in part on sampling a plurality of speed variables obtained from the GPS elements associated with the segment of the driving route.

13. A non-transitory computer-readable medium comprising executable code for providing a prediction of a type of attribute located along a segment of a driving route based on one or more speed variation patterns obtained from Global Positioning System (GPS) elements, that when executed by at least one computer processor causes the at least one computer processor to:
  (a) retrieve a plurality of GPS elements;
  (b) for each GPS element that corresponds to one or more positions along the segment of the driving route, identify a portion of the GPS element recorded along the segment of the driving route to include in an input GPS set;
  (c) represent the segment of the driving route by a multi-dimensional feature vector capturing the one or more speed variation patterns; and
  (d) input the multi-dimensional feature vector into a function for the type of attribute and in response to analyzing the multi-dimensional feature vector input in the function, determining the prediction indicating whether an object of the type of attribute is physically located along the segment of the driving route.

14. The computer-readable medium of claim 13, wherein the multi-dimensional feature vector being configured based on one or more data points of the input GPS set.

15. The computer-readable medium of claim 13, wherein the attribute comprises a traffic light, a stop sign, a yield sign, a speed bump, a reduced speed zone, or mixed traffic signals.

16. The computer-readable medium of claim 13, when executed by the at least one computer processor further causes the at least one computer processor to identify the GPS elements that pass along the segment of the driving route and the portions of the GPS elements that pass along the segment of the driving route recorded along the segment of the driving route by:
  producing a topology from the GPS elements that pass along the segment of the driving route;
  drawing a rectangle to encompass at least a portion of the segment of the driving route to define a boundary; and
  including in the input GPS set the GPS data points located inside the boundary from the portions of the GPS elements that pass along the segment of the driving route.

17. The computer-readable medium of claim 13, wherein the multi-dimensional feature vector comprises an average value of M number of speed values sampled from each of the GPS elements associated with the segment of the driving route.

18. The computer readable medium of claim 13, when executed by the at least one computer processor further causes the at least one computer processor to:
  configure the multi-dimensional feature vector based in part on sampling a plurality of speed variables obtained from the GPS elements associated with the segment of the driving route.

* * * * *